Jan 6, 1931.  H. W. FAUS  1,787,675
TESTING APPARATUS
Filed March 5, 1928    4 Sheets-Sheet 4

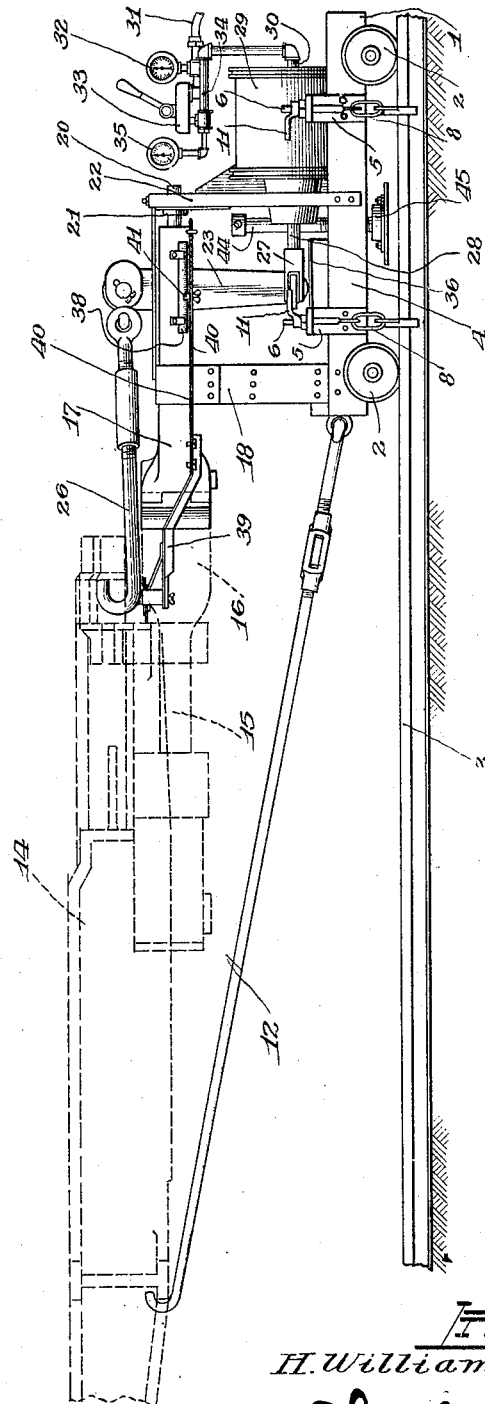

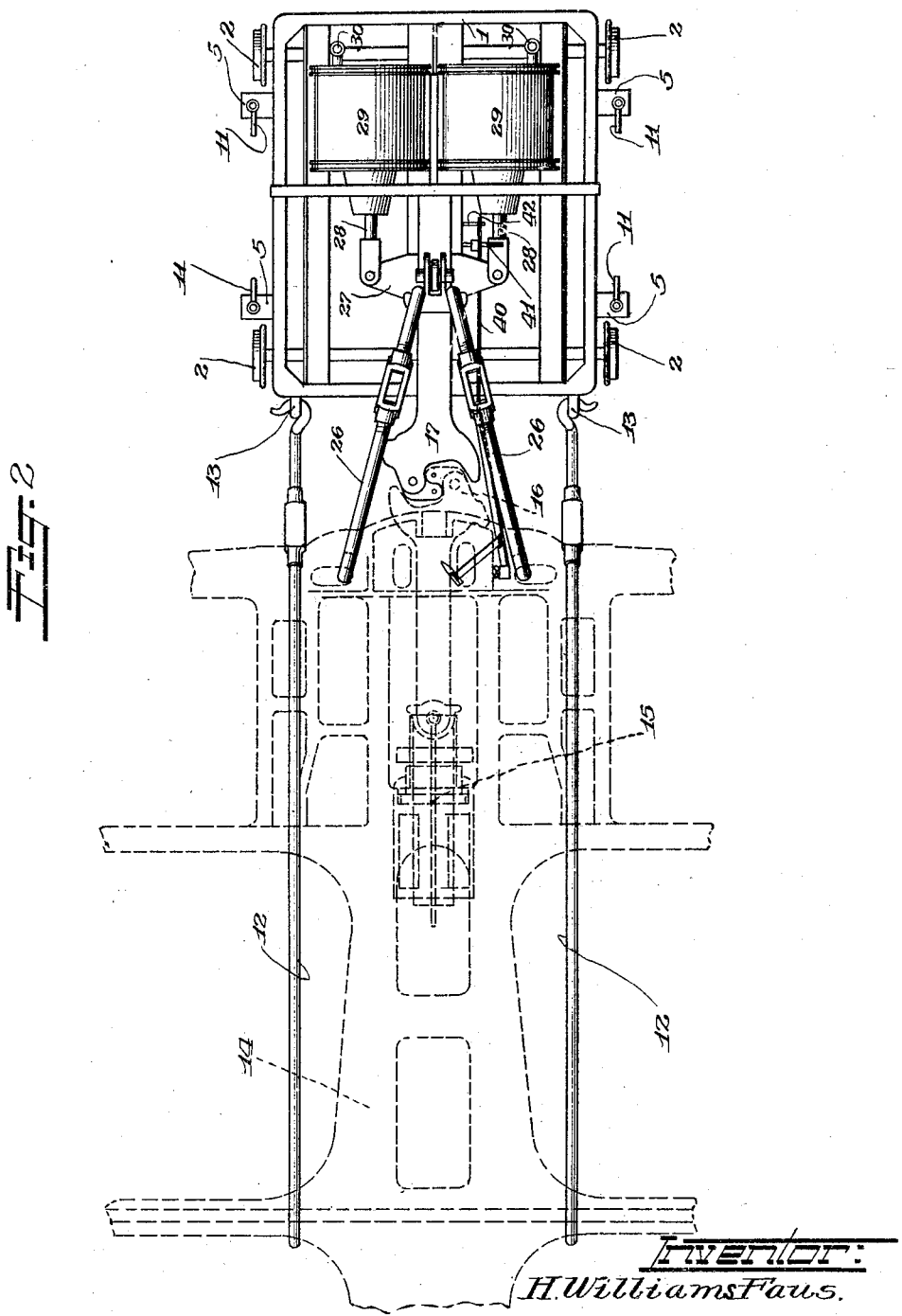

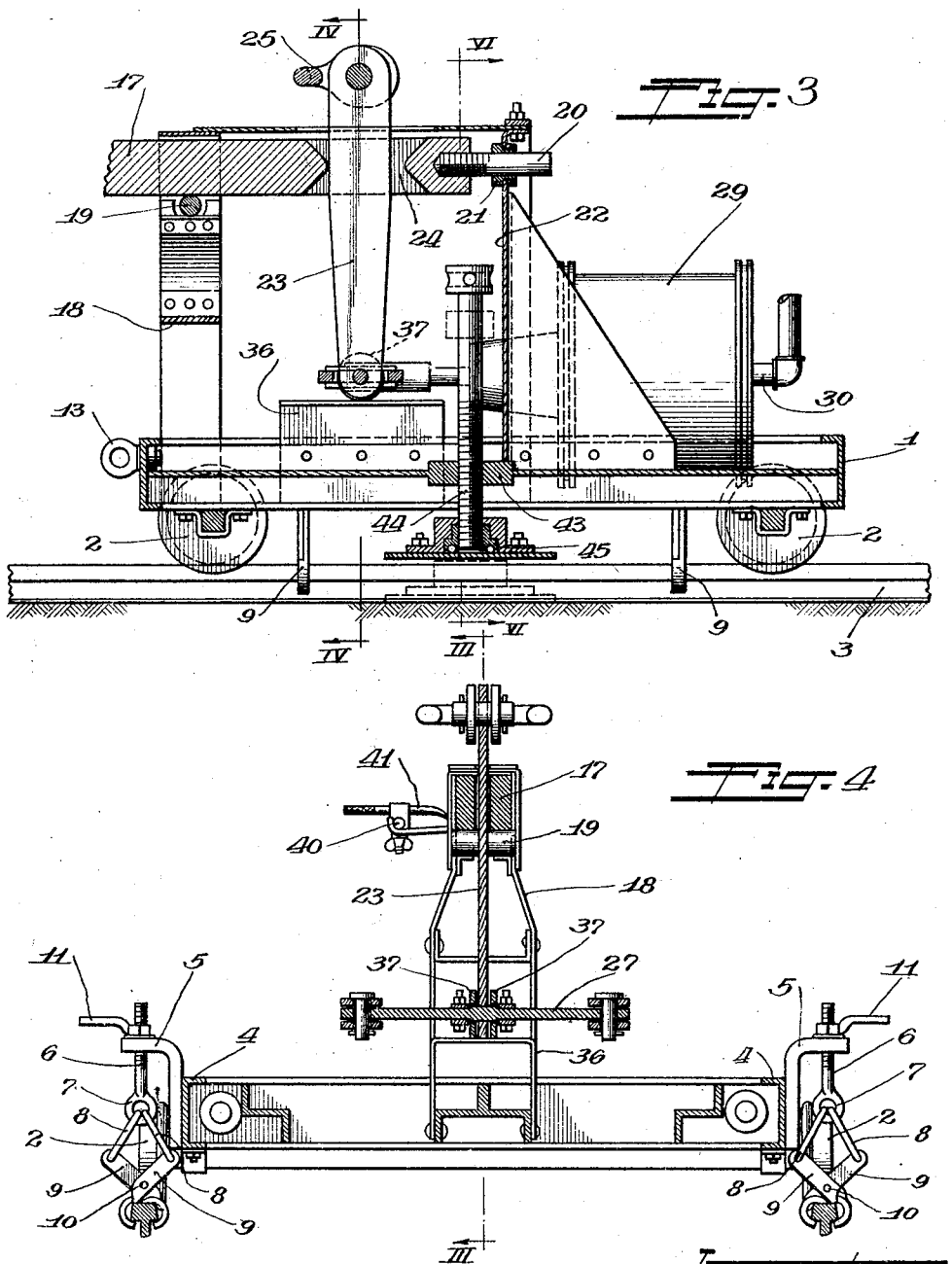

Inventor:
H. Williams Faus.
by: Charles Hill
Attys.

Patented Jan. 6, 1931

1,787,675

UNITED STATES PATENT OFFICE

HERBERT WILLIAMS FAUS, OF WHITE PLAINS, NEW YORK

TESTING APPARATUS

Application filed March 5, 1928. Serial No. 259,116.

This invention relates to a testing apparatus for draft gears.

In railroad traffic, especially in relation to fast trains, parts become loosened, with the result that unpleasant shocks and the like occur. It has heretofore been more or less difficult to locate the cause of such shocks. To determine whether the same arose from some defect such as a weakening of the springs in the draft gears required that the draft gears be removed from the cars for testing and examination, an operation which required a great deal of time and labor.

It is among the objects of this invention to eliminate the necessity of removing the draft gears from the cars in order to test the same, in the provision of means adapted to be immovably positioned with respect to the car and connected to the draft gears for testing the same.

The invention comprises the novel structure and combination of parts hereinafter described and more particularly pointed out and defined in the appended claims.

In the accompanying drawings which illustrate a preferred embodiment of this invention and in which similar reference numerals refer to similar features in the different views:

Figure 1 is a side elevational view of my testing apparatus as applied to a car for testing the draft gear.

Figure 2 is a top plan view of the apparatus shown in Figure 1.

Figure 3 is a part sectional side elevational view of the testing apparatus taken substantially on the line III—III of Figure 4.

Figure 4 is an enlarged sectional view taken upon the line IV—IV of Figure 3.

Figure 5:
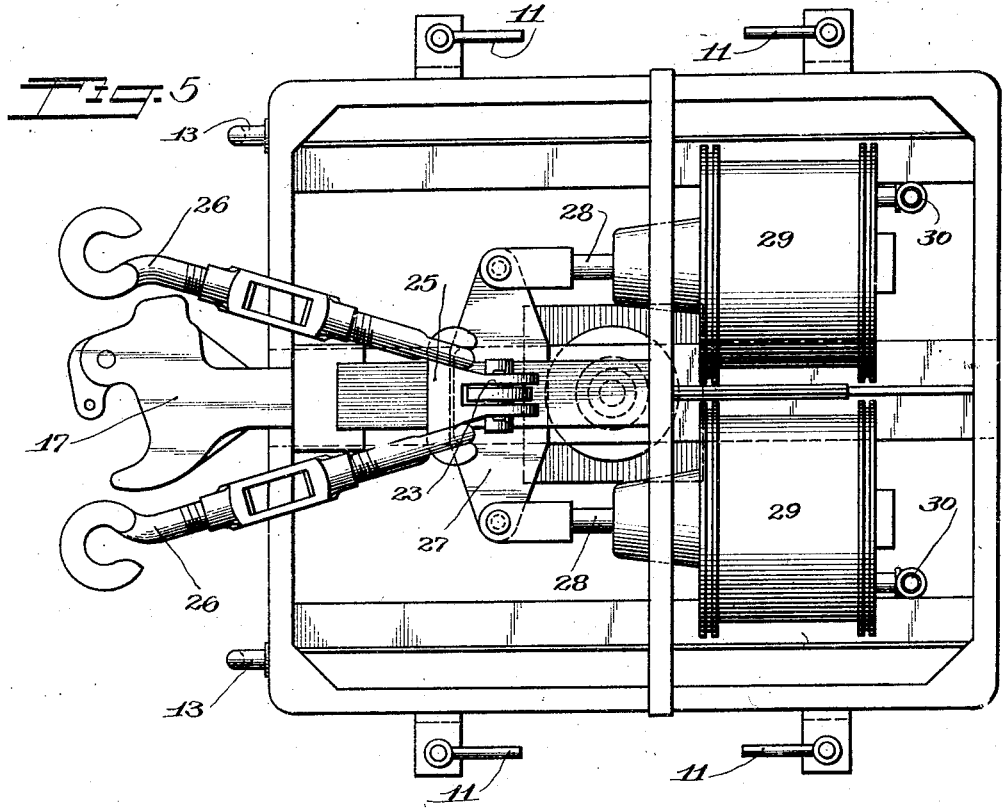
Figure 5 is an enlarged top plan view of the testing apparatus.
Figure 6:
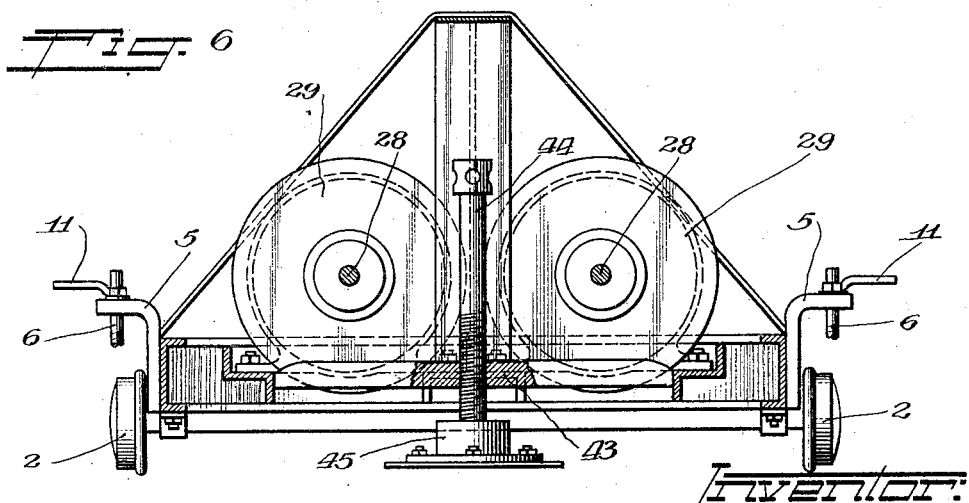
Figure 6 is an enlarged sectional view taken upon the line VI—VI of Figure 3.

In the drawings there is illustrated a testing apparatus which is to be understood as involving one of the embodiments of this invention.

This testing apparatus broadly comprises a portable truck or the like which carries a dummy coupling member adapted to automatically engage the coupling member of a car, in order to test the draft gear thereof. Means are provided for anchoring the testing apparatus in a fixed position and for anchoring the car thereto against relative movement. Any convenient measurable power actuated means for actuating the coupling member comprises a part of the testing apparatus, and means are provided for indicating the extent of movement of the coupling device. With this apparatus, it will be appreciated that a comparison may easily be made between the applied power and the linear movement of the coupling device connected to the draft gear and that the draft gear may be tested at various stages throughout its range of movement.

The pressure which has then been applied to the coupler may be plotted as ordinates against the corresponding movement of the coupler as abscissas on a chart and a static compression curve may be drawn. This curve may be compared with the static compression curve of a new draft gear of the same type and this comparison will clearly show the amount of deterioration which has taken place in the gear tested and also the amount of free slack which has developed in service.

Describing now in more detail the apparatus involving this invention, it will be noted that the same consists of a four-wheeled truck which is generally represented by the reference numeral 1. This wheeled truck has four wheels 2 which are adapted to travel upon a standard railroad track which is represented by the reference numeral 3. The truck embodies side members 4 upon which brackets 5 are secured. A bolt 6 depends thru the top of each bracket. The lower end of each bolt has an eye 7 to which link members 8 are connected. The lower ends of the link members 8 are pivoted to the upper ends of grab hooks 9. Each pair of grab hooks 9 is pivoted intermediate its ends, as indicated at 10, and the lower ends thereof are adapted to engage the rails of the track, as indicated in Figure 4. An adjustable nut 11 is threaded upon the upper end of each bolt, whereby the same may be actuated for clamping the grab hooks upon the track, whereby it becomes possible to firmly anchor the truck to the track against relative movement.

It will be noted in Figure 2 that there are two sets of clamping hooks upon each side of the truck. However, it is contemplated that any other equivalent means may be used for anchoring the truck to the track. At the forward end of the truck are a pair of anchor hooks 12 which are pivotally connected to suitable bearings 13 carried by the truck. These hooks are adapted to engage any suitable part of a car having a draft gear it is desired to test. In Figure 1 a part of such car is shown in dotted lines and is indicated by the reference numeral 14. It will be evident that these anchor hooks extending from the immovable truck 1 will prevent relative movement between the car and the testing apparatus during the testing operation. In Figures 1 and 2 it will be noted that the parts of the car illustrated in dotted lines includes a draft gear, generally denoted by the reference numeral 15 which includes or is connected with a coupling member 16.

Upon the truck 1 there is a dummy coupling member 17 which is adapted to be automatically connected with the coupling member 16 when the testing apparatus is moved upon the track toward the railway car. It will be noted that a standard 18 rises from the front end of the truck. This standard has a bearing at its upper end for a roller 19, over which the coupling member 17 is adapted to travel. The end of the coupling member has a bearing stud 20 threaded therein which slidably operates thru a bearing 21 carried by an upright support 22 on the truck.

An operating lever 23 extends thru a suitable slot 24 in the coupling member. A clevis 25 is attached upon the upper end of the lever 23 and a pair of adjustable hooks 26 are attached to the clevis. These hooks are adapted for engaging suitable parts of the car 14 for anchoring the upper end of the lever.

The lower end of the lever 23 is attached to a crosshead 27 (Figs. 4 and 5) and this crosshead is connected to the piston rods 28, the pistons of which operate in fluid cylinders 29 carried by the truck. Fluid is adapted to be admitted to these cylinders thru the supply pipes 30. The fluid for supplying the pipes 30 may come from any convenient reservoir or pressure chamber. In Figure 1 there is shown a pipe 31 which may lead from such reservoir or chamber. The pipe 31 communicates with a gauge 32 for indicating the pressure in the reservoir or chamber. The fluid then passes thru a valve 33 to a pipe 34 which communicates with a pressure gauge 35 for indicating the pressure in the fluid cylinders. It will, of course, be understood that the pipe 34 is connected to the pipes 30 for supplying the fluid to each cylinder, the pistons of which operate in balanced relation.

In order to support the aforementioned crosshead 27, there is provided a suitable base 36 upon the truck, and a pair of antifriction rollers 37 are carried by the crosshead for traveling upon the track.

Referring to Figure 1, it will be noted that a linear scale 38 is attached to the coupling member 17 for longitudinal movement therewith, and a support 39 is attached to the car and carries an indicator trammel rod 40 attached thereto. A pointer 41 (Fig. 4) is attached to the rod 40 for indicating on the scale 38 the movement of the coupling 17. The inner end of the rod 40 is supported upon a pin 42 extending from the coupling member 17.

When it is desired to remove the truck from the track, the clamping hooks 9 are, of course, released and the truck is elevated above the track, in order that it may be swung in azimuth. To this end, the base of the truck is provided with a bearing 43 (Fig. 3) in which a jack screw 44 is threaded. The lower end of the jack screw is swiveled in a base member 45. As the screw is threaded downwardly, the base member 45 will come in contact with the ground. Further rotation of the jack screw 44 will then elevate the truck above the track, in order that it may be swung in azimuth and removed from the track.

In the operation of this apparatus, the truck is placed upon the track in a yard or the like where the cars, the draft gears of which it is desired to test, are located. The testing truck is then caused to travel on the track until it approaches the car and the coupling member 17 thereof automatically engages the coupling member on the car. The anchor bolts 12 are then attached to the truck and to convenient parts of the car, as illustrated in Figure 2. Likewise, the anchor hooks 26 for the lever 23 are attached to suitable parts of the car, as shown. The truck is then clamped to its track, as previously explained. Of course, it will be realized that these different steps need not be followed in the specific manner related. With the truck secured as above set forth, the fluid pressure may be applied to the cylinders for moving coupling member 17 in a forward direction for operating the draft gear springs. During the movement of the coupling member 17, the scale thereon will naturally move relative to the pointer 41 and indicate the distance that the draft gear has been moved, and the pressure gauge 35 will indicate the applied pressure. By regulating the pressure, the coupling member 17 may be intermittently moved in stages until the springs of the draft gear are fully compressed. The pressure applied at each stage and the distance the draft gear is moved thru each stage may be used in making a chart, as previously set forth.

With this apparatus, it is a very simple matter to test a draft gear upon a car without removing the same and its behavior during different stages of its total scope of operation may be easily tested.

I am aware that many changes may be made, and numerous details of construction may be varied through a wide range without departing from the principles of this invention, and I, therefore, do not purpose limiting the patent granted hereon, otherwise than necessitated by the prior art.

I claim as my invention:

1. A draft gear testing apparatus adapted to be immovably positioned with relation to the car having the draft gear to be tested, means for bracing the testing apparatus with relation to the car, a connection between the draft gear and said testing apparatus, means on the testing apparatus for operating said connection, and an indicating device for showing the condition of the draft gear.

2. A draft gear testing apparatus movable on a track, means for clamping said testing apparatus upon said track, means for bracing the testing apparatus with relation to a car on the track having the draft gear to be tested, a connection between the testing apparatus and the draft gear, means for operating said connection, and an indicating device responsive to the movement of said connection for showing the condition of the draft gear.

3. A draft gear testing apparatus having means for effecting a connection with the draft gear of a car, means for securing the testing apparatus in fixed relation with the car, means upon the testing apparatus for actuating said connection, a stationary indicating member, and a movable indicating member responsive to the movements of the draft gear for showing the condition thereof.

4. A draft gear testing apparatus including a connection between the testing apparatus and the draft gear of a railway car, means for maintaining a substantially fixed relation between the testing apparatus and the car, power means for actuating said connection, an indicator for indicating the amount of power applied, and an indicating mechanism responsive to the movement of the draft gear during a testing operation for indicating the condition thereof.

5. Means for testing a draft gear comprising a wheeled apparatus, means for establishing a fixed relation between said apparatus and the car having the draft gear to be tested, said testing apparatus including a power actuated element, and a connection between said power actuated element and said draft gear, means for indicating the applied power, and an indicating device responsive to the movement of the draft gear for determining the condition thereof.

6. A draft gear testing apparatus movable on a track, means for establishing a fixed relation between said testing apparatus and a car having the draft gear to be tested, said testing apparatus including a power actuated element, a connection between said element and the draft gear, means for indicating the power applied to said connection, a stationary indicating device, and a movable indicating device cooperating therewith and responsive to the movement of the draft gear for the purpose set forth.

7. A draft gear testing apparatus comprising a truck movable upon a track, means for clamping said truck to said track, means for locking said truck to a car having the draft gear to be tested, power actuated mechanism upon said truck having a connection with said draft gear, means for indicating the force of the power, and an indicator for indicating the effect of the applied power upon said draft gear.

8. A draft gear testing apparatus comprising a truck movable upon a track, means for clamping said truck to said track, means for anchoring said truck to a car having the draft gear to be tested, a reciprocating member on said truck having a connection with said draft gear, power actuated means for reciprocating said member, means for determining the power applied, and an indicator responsive to the movements of said connection for determining the effect upon the draft gear.

9. A draft gear testing mechanism comprising a wheeled truck operable on a track and having a coupling member adapted to be automatically coupled to the coupler of a car, the draft gear of which is to be tested, a measurable power applying means upon said truck for actuating said coupling members, and an indicating device responsive to the movement of the car coupling for the purpose set forth.

10. A draft gear testing apparatus movable upon a track and having a coupling for automatically engaging the coupling of a car, the draft gear of which is to be tested, means for anchoring said apparatus, power actuated means for actuating said coupling members in one direction, means for indicating the power applied to said coupling members, and an indicating device responsive to the movement of said coupling members for indicating the linear movement thereof.

11. A draft gear testing apparatus movable over a track and having a coupling adapted for automatic connection with the coupling of a car, the draft gear of which is to be tested, means for anchoring said testing apparatus in a predetermined position, anchor rods connecting said testing apparatus and car, measurable power actuated means for actuating said couplings in one direction, and an indicator responsive to the movement of said coupling for indicating the linear movement thereof.

12. In an apparatus of the class described, a wheeled truck, clamping mechanism for anchoring said truck to a track, a reciprocating coupling member on said truck, a lever connected to said coupling member, means for anchoring one end of said lever against movement, and a measurable power actuated means applied to the other end of said lever for actuating the same.

13. In an apparatus of the class described, a wheeled truck, means for anchoring the same in a predetermined position, a lever actuated coupling device carried by said truck, a measurable power actuated means for actuating said lever, and an indicator responsive to the movement of said coupling device.

14. In an apparatus of the class described, a portable truck, means for anchoring the same in a predetermined position, a reciprocal car coupling member mounted on said truck, a lever connected to said coupling member, power actuated means for operating said lever, means for indicating the power applied to said lever, and an indicator responsive to the movements of said coupling member for the purpose set forth.

15. A draft gear testing apparatus comprising a truck movable over a track, means for anchoring said truck in a predetermined position upon said track, anchor members extending from said truck to a car, the draft gear of which is to be tested, a coupling member carried by said truck adapted for automatically engaging the draft gear coupling member, a lever anchored at one end to said truck carried coupling member, fluid operated mechanism connected to said lever, means for indicating the pressure of the applied fluid, a stationary pointer, and a scale movable with said coupling members for indicating the linear movement thereof.

16. A draft gear testing apparatus comprising a wheeled truck movable on a track and having a coupling member adapted for automatically engaging the coupling member of a car, the draft gear of which is to be tested, means for anchoring said truck upon said track, anchoring members for connecting said truck with said car, a lever anchored to said car and having a connection with the coupling member upon said truck, fluid actuated mechanism for actuating said lever, a gauge for indicating the pressure of said fluid, and an indicating mechanism responsive to the movement of said coupling members for indicating the relative movement thereof.

17. In an apparatus of the class described, a wheeled truck, means for anchoring the same in a fixed position, a lever on said truck, a coupling member connected to said lever, a pair of fluid cylinders on said truck, a piston in each cylinder, a crosshead connected to said pistons, said crosshead having a connection to said lever, means for supplying fluid to said cylinders, means for indicating the pressure of the applied fluids, and means for indicating the extent of movement of said coupling.

18. In an apparatus of the class described, a wheeled truck, means for anchoring said truck against movement, a coupling member carried by said truck, power operated means for operating said coupling member, means for measuring the power applied to said coupling member, and means for indicating the linear movement of the same.

19. In an apparatus of the class described, a wheeled truck, means for anchoring said truck to a track, a coupling member on said truck, a lever having a connection intermediate its ends with said coupling member, means for anchoring one end of said lever against movement, power operated means connected to the other end of said lever, means for measuring the power applied to said lever, and means for indicating the extent of movement of said coupling member due to the applied power.

In testimony whereof I have hereunto subscribed my name at New York, New York County, New York.

HERBERT WILLIAMS FAUS.